US009981567B2

United States Patent
Kawano et al.

(10) Patent No.: US 9,981,567 B2
(45) Date of Patent: May 29, 2018

(54) BATTERY CONTROLLER

(71) Applicant: MITSUBISHI JIDOSHA KOGYO KABUSHIKI KAISHA, Tokyo (JP)

(72) Inventors: Shohei Kawano, Tokyo (JP); Toshifumi Mizui, Tokyo (JP); Yoshifumi Nobori, Tokyo (JP); Atsushi Kodama, Tokyo (JP); Naoto Tagaya, Tokyo (JP); Katsuyoshi Muramatsu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 15/286,740

(22) Filed: Oct. 6, 2016

(65) Prior Publication Data

US 2017/0101029 A1 Apr. 13, 2017

(30) Foreign Application Priority Data

Oct. 7, 2015 (JP) ................................. 2015-199431

(51) Int. Cl.
*H02J 7/00* (2006.01)
*B60L 11/18* (2006.01)
(Continued)

(52) U.S. Cl.
CPC ............. *B60L 11/1872* (2013.01); *B60L 1/02* (2013.01); *B60L 3/0038* (2013.01);
(Continued)

(58) Field of Classification Search
CPC ...... B60L 11/1872; B60L 1/02; B60L 3/0038; B60L 3/0046; B60L 3/04
(Continued)

(56) References Cited

U.S. PATENT DOCUMENTS 6,417,648 B2 * 7/2002 Suzuki ................. H02J 7/0014
320/136
6,812,670 B2 * 11/2004 Minamiura ........ G01R 31/3658
320/116

(Continued)

FOREIGN PATENT DOCUMENTS

JP 2009-38925 A 2/2009
JP 2010-183679 A 8/2010
(Continued)

*Primary Examiner* — M'Baye Diao
(74) *Attorney, Agent, or Firm* — Birch, Stewart, Kolasch & Birch, LLP

(57) ABSTRACT

A battery controller that controls a battery for supplying power to a load apparatus, includes a current detection unit that detects a discharge current and a charge current of the battery, a malfunction detection unit that detects malfunction of a voltage detector for detecting a voltage of the battery, and a contactor control unit that is provided on a power supply line through which the discharge current and the charge current flow to open/close a contactor. The contactor control unit integrates the charge and discharge current when the malfunction of the voltage detector is detected, calculates an actual charge current amount obtained by subtracting an integrated value of the discharge current from an integrated value of the charge current, and prohibits charging/discharging of the battery by controlling the contactor when the actual charge current amount is equal to or more than a predetermined value.

19 Claims, 3 Drawing Sheets

(51) Int. Cl.
  *H02J 7/14* (2006.01)
  *H01M 10/48* (2006.01)
  *B60L 1/02* (2006.01)
  *B60L 3/00* (2006.01)
  *B60L 3/04* (2006.01)
  *B60L 7/14* (2006.01)
  *H01M 10/42* (2006.01)

(52) U.S. Cl.
  CPC ............ *B60L 3/0046* (2013.01); *B60L 3/04* (2013.01); *B60L 7/14* (2013.01); *B60L 11/1803* (2013.01); *B60L 11/1816* (2013.01); *B60L 11/1818* (2013.01); *B60L 11/1842* (2013.01); *B60L 11/1844* (2013.01); *B60L 11/1846* (2013.01); *B60L 11/1859* (2013.01); *B60L 11/1861* (2013.01); *B60L 11/1875* (2013.01); *H01M 10/486* (2013.01); *H02J 7/0026* (2013.01); *H02J 7/0031* (2013.01); *H02J 7/0055* (2013.01); *H02J 7/1461* (2013.01); *B60L 2210/30* (2013.01); *B60L 2230/22* (2013.01); *B60L 2240/429* (2013.01); *B60L 2240/545* (2013.01); *B60L 2240/547* (2013.01); *B60L 2240/549* (2013.01); *B60L 2250/16* (2013.01); *H01M 2010/4271* (2013.01); *H01M 2220/20* (2013.01); *H02J 7/0047* (2013.01); *H02J 2007/0037* (2013.01); *Y02E 60/721* (2013.01); *Y02T 10/642* (2013.01); *Y02T 10/7005* (2013.01); *Y02T 10/705* (2013.01); *Y02T 10/7044* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
  USPC .......................................................... 320/109
  See application file for complete search history.

(56) References Cited

U.S. PATENT DOCUMENTS

| | | | |
|---|---|---|---|
| 6,873,135 | B2 | 3/2005 | Nakatsuji |
| 7,714,543 | B2 | 5/2010 | Yoshida |
| 2006/0208693 | A1* | 9/2006 | Emori ................ H02J 7/0047 320/106 |
| 2013/0076314 | A1* | 3/2013 | Nagakura ............ H01M 10/44 320/162 |
| 2016/0223616 | A1* | 8/2016 | Yoshino ............. G01R 31/3606 |

FOREIGN PATENT DOCUMENTS

| | | |
|---|---|---|
| JP | 2012-249455 A | 12/2012 |
| JP | 2013-198300 A | 9/2013 |

\* cited by examiner

BATTERY CONTROLLER

CROSS REFERENCE TO RELATED APPLICATION

This application is based on Japanese Patent Application No. 2015-199431 filed on Oct. 7, 2015, the contents of which are incorporated herein by reference.

BACKGROUND OF THE INVENTION

1. Technical Field

The present invention relates to a battery controller which controls a battery.

2. Related Art

In the related art, electric power vehicles such as hybrid vehicles or electric vehicles are mounted with a high-voltage battery that stores power for driving a traveling motor. A lower limit state-of-charge and an upper limit state-of-charge of use are set in a battery, and input/output of a current (charging/discharging) is performed such that the battery is used with the state of charge between the lower limit and the upper limit. The reason is that the battery becomes an overcharge state in a case of exceeding the upper limit state-of-charge of use, the battery becomes an over-discharge state in a case of being below the lower limit state-of-charge of use, and performance of the battery deteriorates even in any case.

For example, a technique is disclosed in Japanese Unexamined Patent Application Publication No. 2013-198300 in which when a secondary battery is charged with a constant voltage, if the secondary battery is determined to be fully charged based on a voltage value and a value of a current flowing in the secondary battery and an ambient temperature of the secondary battery is equal to or higher than a predetermined temperature, constant voltage charging is continuously performed, and if the ambient temperature of the secondary battery is lower than the predetermined temperature, the constant voltage charging is stop, thereby preventing the overcharge.

In addition, a technique is disclosed in Japanese Unexamined Patent Application Publication No. 2012-249455 in which a power supply and a battery are connected to each other when a voltage of the battery is lower than a threshold value, and the power supply and the battery are disconnected from to each other when the voltage of the battery is higher than a predetermined value determined higher than the threshold value, thereby suppressing deterioration of the battery caused by the overcharge.

In general, a state of charge (SOC) of the battery is calculated based on a voltage value of a battery, but a correct calculation of the SOC becomes difficult when malfunction occurs in a voltage detector that detects a voltage of the battery.

For this reason, when the malfunction of the voltage detector occurs and the correct calculation of the SOC becomes difficult, it is also considered to immediately prohibit the use of the battery in order to protect the battery.

In a case where the battery is used as a power supply for driving the electric power vehicle, however, it is expected that a disadvantage of the user increases when the vehicle is suddenly unavailable.

Since it is considered to have great influence on the battery and surroundings thereof in a case where the battery becomes an overcharge state compared that the battery becomes an over-discharge state, a method is also considered in which only the output from the battery is permitted and the electric power vehicle continuously travels when the malfunction occurs.

However, for example, when the malfunction occurs in a state where the SOC is low, power in the battery may be exhausted before the arrival at a vehicle repairer or the like.

The invention has been made in view of such circumstances, and an object thereof is to provide a battery usable in an appropriate range when malfunction occurs in a voltage detection unit of the battery.

SUMMARY OF THE INVENTION

[1] According to an aspect of the battery controller, a battery controller that controls a battery for supplying driving power to a load apparatus, includes a current detection unit that detects a discharge current to be discharged from the battery and a charge current to be charged to the battery, a malfunction detection unit that detects malfunction of a voltage detector for detecting a voltage of the battery, and a contactor control unit that is provided on a power supply line through which the discharge current and the charge current flow to control opening/closing of a contactor, the power supply line connecting the battery and the load apparatus. In the battery controller, the contactor control unit integrates the charge current and the discharge current detected by the current detection unit when the malfunction of the voltage detector is detected by the malfunction detection unit, calculates an actual charge current amount which is obtained by subtracting an integrated value of the discharge current from an integrated value of the charge current, and prohibits charging/discharging to and from the battery by controlling the contactor to be opened when the actual charge current amount is equal to or more than a predetermined value.

[2] In the battery controller according to [1], the load apparatus is a traveling motor of an electric power vehicle, the discharge current is used to run the traveling motor, and the charge current is generated by regeneration of the traveling motor.

[3] In the battery controller according to [2], a body of the electric vehicle is provided with a charge and discharge connector that is connectable to an external charger for charging the battery or an external device for driving using power of the battery, and the discharge current is used to drive the external device, and the charge current is supplied from the external charger.

[4] The battery controller according to any one of [1] to [3] further includes a state-of-charge calculating unit that calculate a state of charge of the battery based on the voltage detected by the voltage detector. In the battery controller, the contactor control unit sets a predetermined value based on the state of charge calculated using the voltage immediately before the malfunction of the voltage detector is detected.

[5] In the battery controller according to [4], the higher the state of charge calculated based on the voltage detected by the voltage detector immediately before the malfunction of the voltage detector is detected is, the smaller the predetermined value to be set by the contactor control unit is.

[6] In the battery controller according to any one of [1] to [5], the higher a temperature of the battery is, the smaller the predetermined value to be set by the contactor control unit is.

[7] The battery controller according to any one of [1] to [6] further includes a notification unit that notifies the malfunction to a user when the malfunction of the voltage detector is detected by the malfunction detection unit.

With the configuration [1], when the malfunction of the voltage detector in the battery is detected, the charge current to be supplied to the battery and the discharge current output from the battery are integrated; and when the actual charge current amount obtained by subtracting the integrated value of the discharge current from the integrated value of the charge current is equal to or more than the predetermined value, the charging/discharging to and from the battery is prohibited. Therefore, even after the malfunction of the voltage detector occurs, it is advantageously possible to continuously use the battery while preventing the damage of surrounding members due to influence caused by the overcharge of the battery, for example, due to the malfunction or heat generation of the battery. Further, when the actual charge current amount is in the range less than the predetermined value, the charging of the battery is permitted, and thus it is advantageously possible to prolong the usable period of the battery and improve the convenience of the user, compared to the case where the charging of the battery is prohibited.

With the configuration [2], when the battery is used as the power supply for driving the electric power vehicle, the electric power vehicle can travel throughout a period of time even after the malfunction of the voltage detector occurs. Thus, it is advantageously possible to avoid a situation in which the battery becomes suddenly unavailable while the electric power vehicle is gone and thus the electric power vehicle is stalled, for example, and facilitate the flow of traffic on the road.

With the configuration [3], when the battery is used as the power supply for driving the external device, the external device can be used throughout a period of time even after the malfunction of the voltage detector occurs. Thus, it is advantageously possible to improve the convenience at the time of using the external device at a place where the user has gone or during power failure.

With the configurations [4] and [5], since the upper limit value (predetermined value) of the actual charge current amount is set based on the SOC calculated using the voltage immediately before the malfunction of the voltage detector is detected, it is advantageously possible to efficiently utilize performance of the battery.

With the configuration [6], the overcharge state can be prevented even when the temperature of the battery is high.

With the configuration [7], the malfunction of the voltage detector is notified to the user as the malfunction of the battery, and thus it is advantageous that the user can quickly take the countermeasure such as a repair.

DESCRIPTION OF PREFERRED EMBODIMENT

A preferred embodiment of a battery controller according to the invention will be described in detail below with reference to the accompanying drawings.

Figure 1:
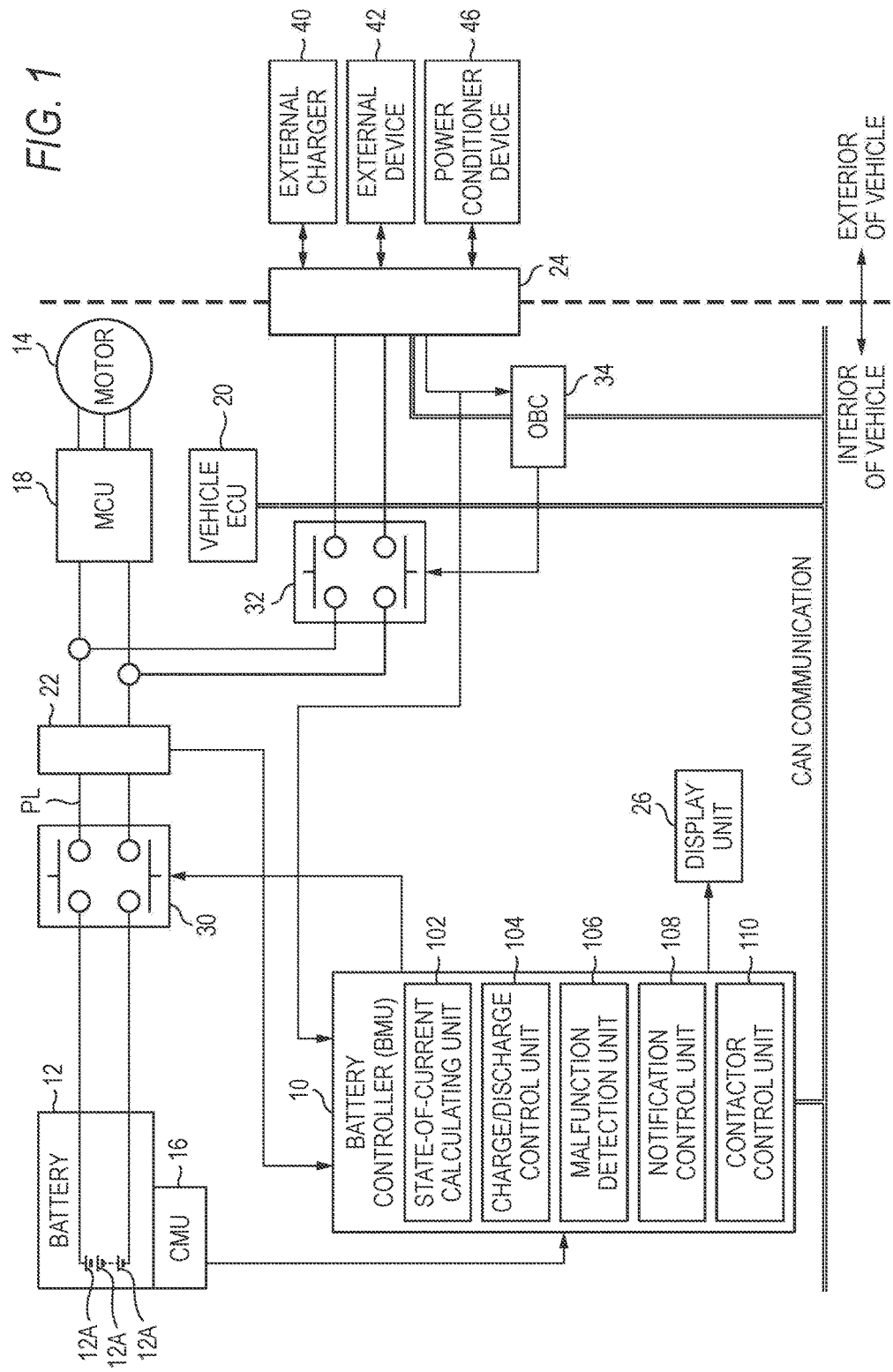
FIG. 1 is an explanatory diagram illustrating a configuration of a battery controller 10 according to an embodiment.

FIG. 1 is an explanatory diagram illustrating a configuration of a battery controller 10 according to the embodiment.

The battery controller 10 controls a battery 12 that supplies driving power to a load apparatus. More specifically, the battery controller 10 is a BMU (Battery Management Unit) that monitors a state of charge or the presence/absence of malfunction of the battery 12, for example.

In the embodiment, the load apparatus is a traveling motor 14 of an electric power vehicle, and the battery 12 supplies driving power to the traveling motor 14. Although a case where only the traveling motor 14 is mounted in a driving source of the electric power vehicle is described in the embodiment, the invention is applicable to a hybrid vehicle mounted with the traveling motor 14 and an engine.

The embodiment explains a case where the load apparatus is a traveling motor 14. As explained follow, an MCU 18 (Motor Control Unit), OBC (On Board Charger) 34, an automotive air conditioner or PTC (Positive Temperature Coefficient) heater for warming up a battery 12 may be used as the load apparatus in the present invention.

The battery 12 is connected to a plurality of battery cells 12A in series, and can output a high voltage to the traveling motor 14.

In addition, the battery 12 is provided with a CMU (Cell Monitor Unit) 16 that monitors a voltage or a temperature of each battery cell 12A and detects a voltage of the overall battery 12. The CMU 16 corresponds to a voltage detector. The voltage or the temperature of each battery cell 12A and the voltage of the battery 12 detected by the CMU 16 are output to the battery controller 10.

The traveling motor 14 runs using the power stored in the battery 12 (discharge current of the battery 12), and rotates an axle of the electric power vehicle. Furthermore, the traveling motor 14 functions as a generator during deceleration of the electric power vehicle, and thus generates a regenerative current. The regenerative current generated by the traveling motor 14 can be used to charge the battery 12.

An MCU 18 is provided between the traveling motor 14 and the battery 12, to convert a direct current to be supplied from the battery 12 into an alternating current (three-phase alternating current) using an inverter accommodated in the MCU 18 and supply the converted alternating current to the traveling motor 14. More specifically, the MCU 18 is connected to a vehicle ECU 20 that controls the overall electric power vehicle, and drives the inverter according to the output of the traveling motor 14 which is required from the vehicle ECU 20.

During regeneration of the traveling motor 14, the generated alternating current inverts into a direct current by the inverter accommodated in the MCU 18 to charge the battery 12.

In addition, a body of the electric power vehicle is provided with a charge and discharge connector 24 (charge and discharge interface) that is connectable to an external charger 40 for charging the battery 12 or an external device 42 for driving using the power of the battery 12.

The external charger 40 is, for example, a charger that is installed in charging stations, commercial facilities, or a user's house. At the time of connection of the external charger 40 to the charge and discharge connector 24, a charge current is supplied from the external charger 40.

In addition, the external device 42 is, for example, an electric appliance in the electric power vehicle to be used in a place where a user has gone or an electric appliance installed in the user's house. When the external device 42 is connected to the charge and discharge connector 24, a discharge current is supplied from the battery 12 due to the driving of the external device 42. When the external device 42 is actually connected to the charge and discharge connector 24, it is connected to an adapter that conforms to the plug shape of the external device 42. Separately from the charge and discharge connector 24, a receptacle (plug receptacle) that conforms to the plug shape of the external device 42 may be provided in the electric power vehicle.

The charge and discharge connector 24 may be connected to power conditioner device (V2H device) 46 in which an interface to the external device 42 and the external charger are integrated with each other, for example. For example, the power conditioner device 46 is installed in the user's house, whereby the battery 12 of the electric power vehicle can be charged by being supplied with the power generated by the solar power generation or the like, or the power of the battery 12 can be supplied to the electric appliance in the house through a distribution board.

A power supply line PL coupling the battery 12 with the traveling motor 14 is provided with a main contactor 30 that disconnects electric connection between the battery 12 and the traveling motor 14.

The main contactor 30 is turned on/off by control of the battery controller 10. For example, the battery controller 10 turns on (closes) the main contactor 30 and turns on a high voltage system of the electric power vehicle when the electric power vehicle starts to move, to make a state where the power can be supplied to the traveling motor 14 from the battery 12. Meanwhile, the battery controller 10 turns off (opens) the main contactor 30 when the operation of the electric power vehicle is finished, to prevent the current from flowing to the power supply line PL at the time of the stop of the electric power vehicle (at the time of stop of the high voltage system).

In order to suppress an inrush current when the main contactor 30 is turned on (when a high-voltage circuit is connected), a precharge contactor and a precharge resistor (which are not illustrated in the drawings) are provided on a positive electrode side or a negative electrode side of the main contactor 30, respectively.

A charging contactor 32 is provided between the power supply line PL and the charge and discharge connector 24 to disconnect electric connection between the battery 12 and the charge and discharge connector 24. The charging contactor 32 is turned on/off by control of an OBC 34. The OBC 34 detects a connection state to the charge and discharge connector 24. Thus, the OBC 34 turns off (opens) the charging contactor 32 when nothing is connected to the charge and discharge connector 24, so that a current is not supplied to the charge and discharge connector 24; meanwhile, the OBC 34 turns on (closes) the charging contactor 32 when the external charger 40 or the external device 42 is connected to the charge and discharge connector 24, to make a state where power can be transferred between the connected device and the battery 12.

On the power supply line PL, an ammeter 22 is provided to detect a current to be input and output to/from the battery 12, that is, a discharge current to be discharged from the battery 12 and a charge current to be charged to the battery 12. The ammeter 22 corresponds to a current detection unit.

The value detected by the ammeter 22 is output to the battery controller 10.

In FIG. 1, the ammeter 22 is provided near the traveling motor 14 from the main contactor 30. However, the ammeter 22 may be provided near the battery 12 from the main contactor 30.

A display unit 26 is, for example, a monitor or a display lamp provided at a position visible from a driver. In this embodiment, the display unit 26 functions as a notification unit that notifies the fact to the driver by a notification control unit 108 to be described below when malfunction of the CMU 16 (serving as a voltage detector) occurs and urges the driver to take countermeasures such as a repair.

The BMU being the battery controller 10 includes, for example, a CPU, a ROM that stores and memories a control program, a RAM serving as an operating space of the control program, an EEPROM that holds various types of data in a rewritable manner, and an interface unit that interfaces with peripheral circuits.

The battery controller 10 functions as a SOC calculating unit 102, a charge/discharge control unit 104, a malfunction detection unit 106, the notification control unit 108, and a contactor control unit 110 when the control program is executed by the CPU.

The SOC calculating unit 102 calculates a state of charge of the battery 12 based on the voltage of the battery 12 (or battery cell 12A) detected by the CMU 16 serving as the voltage detector.

The SOC calculating unit 102 calculates the state of charge of the battery 12 based on a map indicating the correlation between the voltage and the state of charge of the battery 12, for example.

The SOC calculating unit 102 cannot accurately calculate the state of charge after the malfunction of the CMU 16 is detected.

The charge/discharge control unit 104 controls the amount of current to be input and output to/from the battery 12, based on the state of charge of the battery 12 calculated by the SOC calculating unit 102. More specifically, the charge/discharge control unit 104 controls the SOC of the battery 12 not to exceed the prescribed upper limit SOC of use of the battery 12 and not to be less than the lower limit SOC of use.

Specifically, for example, when the SOC of the battery 12 reaches near the upper limit SOC of use, the current is suppressed from being input to the battery 12 by prohibition of a regenerative operation of the traveling motor 14 or suppression of a regeneration amount thereof, and the deceleration amount is obtained by actuation of a brake mechanism.

In addition, for example, the SOC of the battery 12 reaches near the lower limit SOC of use, the charging of the external charger 40 is promoted, and the battery 12 is controlled to be charged by the regenerative operation of the traveling motor 14.

The malfunction detection unit 106 detects malfunction of the CMU 16 which is the voltage detector.

The malfunction detection unit 106 determines that the malfunction of the CMU 16 occurs when the output of the signal from the CMU 16 is interrupted or is in a different level from a normal case, for example.

The notification control unit 108 outputs information for notifying the fact to the display unit 26 when the malfunction of the CMU 16 is detected by the malfunction detection unit 106. In this embodiment, it is assumed that the malfunction of the CMU 16 is notified as a state where the battery 12 cannot be normally used, that is, as malfunction of the battery 12.

The contactor control unit 110 controls opening/closing of the contactor 30 provided on the power supply line PL through which the discharge current and the charge current of the battery 12 flow.

For example, when the operation of the electric power vehicle is finished, the contactor control unit 110 turns off (opens) the main contactor 30, and thus prevents the current from flowing to the power supply vehicle PL at the time of the stop of the electric power vehicle. In addition, the contactor control unit 110 turns on (closes) the main contactor 30 when the electric power vehicle starts to move, and thus makes a state where the power can be supplied to the traveling motor 14 from the battery 12.

Further, the contactor control unit 110 integrates the charge current to the battery 12 and the discharge current from the battery 12 when the malfunction of the CMU 16 serving as the voltage detector is detected by the malfunction detection unit 106. Moreover, the contactor control unit 110 prohibits charging and discharging to/from the battery 12 by controlling the main contactor 30 to open when an actual charge current amount obtained by subtracting the discharge current from the charge current is equal to or more than a predetermined value.

The battery controller 10 is connected to an OBC 34 or a vehicle ECU through a CAN.

Figure 2:
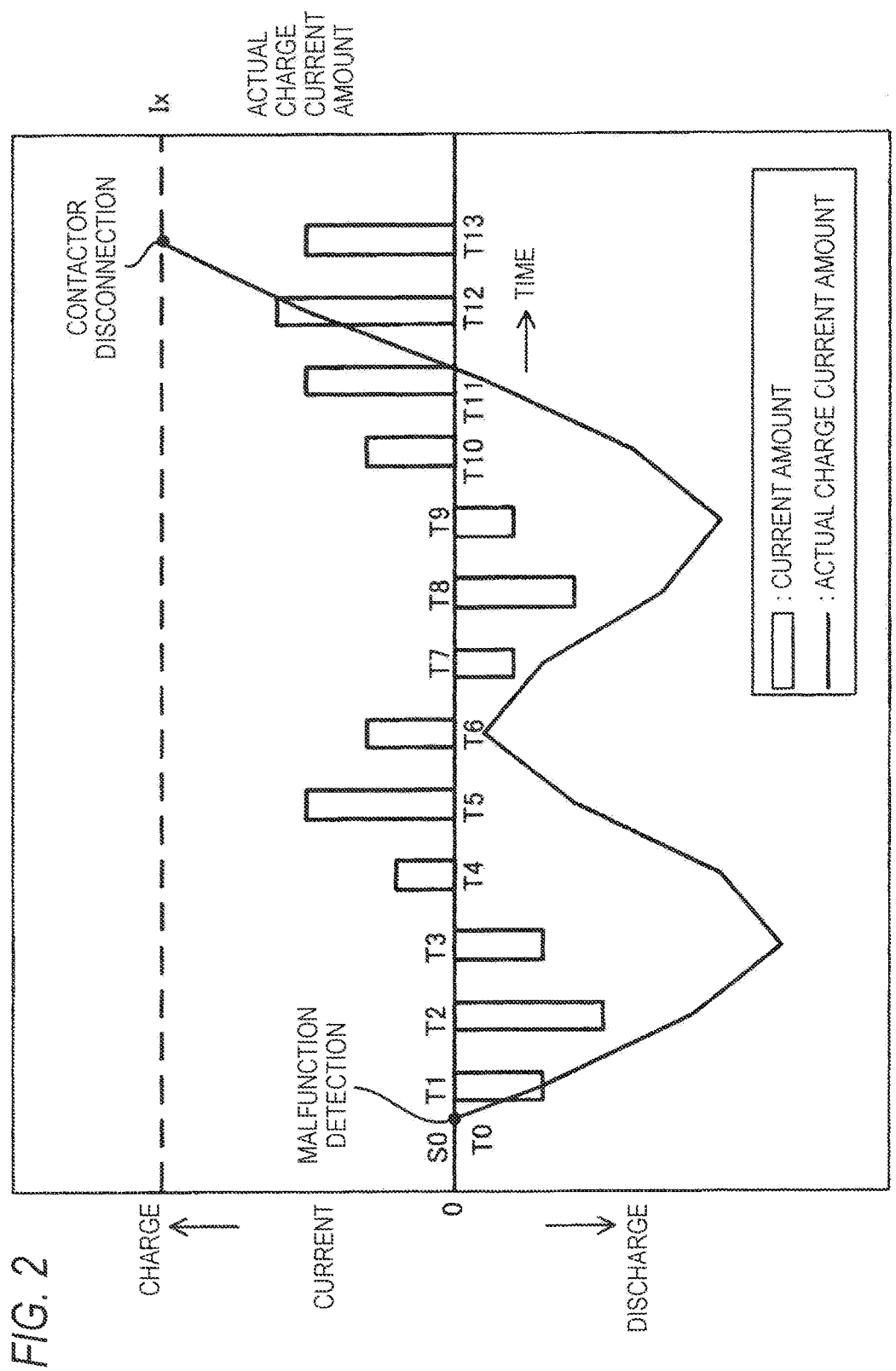
FIG. 2 is an explanatory diagram illustrating schematically an input/output of a current to and from a battery 12.

FIG. 2 is an explanatory diagram schematically illustrating an input/output of a current to and from the battery 12.

In FIG. 2, the amount of current (left vertical axis) to be input and output to/from the battery 12 is represented by a bar graph, wherein a plus direction indicates the charge current and a minus direction indicates the discharge current. In addition, the actual charge current amount (right vertical axis) obtained by subtracting the integrated value of the discharge current from the integrated value of the charge current is represented by a line graph. The horizontal axis represents a time elapsed from the malfunction detection of the CMU 16.

When a time at which the malfunction of the CMU 16 is detected is defined as a time T0, the SOC of the battery 12 at that time is defined as a reference SOC S0. The SOC of the battery 12 indicated by the line graph is proportional to the actual charge current amount.

At times T1 to T3 and T7 to T9, the traveling motor 14 runs and the current is discharged from the battery 12. In this case, the SOC of the battery 12 becomes smaller.

At times T4 to T6 and T10 to T13, the traveling motor 14 is regenerated, the battery 12 is charged by a regenerative current. In this case, the SOC of the battery 12 rises.

When the running operation and the regeneration operation of the traveling motor 14 are sequentially performed during the traveling of the electric power vehicle, the SOC of the battery 12 increases and decreases in conjunction with these operations.

As described above, the SOC of the battery 12 is controlled to be in the prescribed usable range by the charge/discharge control unit 104 in a normal time (during non-malfunction of the voltage detector).

On the other hand, when the malfunction of the CMU 16 serving as the voltage detector is detected by the malfunction detection unit 106, the correct SOC can be hardly detected, and the battery 12 may be overcharged.

Thus, the contactor control unit 110 integrates the charge current to the battery 12 and the discharge current from the battery 12. Therefore, the contactor control unit 110 prohibits the charging/discharging to and from the battery 12 by controlling the main contactor 30 to open when the actual charge current amount (the line graph in FIG. 2) obtained by subtracting the integrated value of the discharge current from the integrated value of the charge current becomes equal to or more than a predetermined value.

In FIG. 2, for example, the predetermined value of the actual charge current amount is set to Ix. The main contactor 30 is disconnected at the time T13 at which the actual charge current amount becomes Ix, and the charging/discharging to and from the battery 12 may be disabled.

For example, the predetermined value Ix may be set based on the SOC calculated by the SOC calculating unit 102 based on a voltage immediately before the malfunction of the CMU 16 is detected. In order to prevent the overcharge state of the battery 12, that is, the predetermined value Ix is set in inverse proportion to the SOC immediately before the malfunction of the CMU 16 is detected. In this case, the predetermined value Ix is set to a small value as the SOC is closer to a full charge (100%), whereas the predetermined value Ix is set to a large value as the SOC is closer to 0%.

Furthermore, the predetermined value Ix may be set based on a temperature of the battery 12. More specifically, as the temperature of the battery 12 becomes higher, the predetermined value Ix is set to be lower, and thus a margin of the charge current from the time of the malfunction detection may be set to be small.

This is because it is expected at a high temperature compared to a low temperature that a resistance value of the battery 12 is low, a current easily flows, and the SOC is easy to increase.

In FIG. 2, the description is made on the case of the traveling of the electric power vehicle. However, the description may be similarly made on a case where the electric power vehicle is used as a power supply by connection with the external device 42 at the time of the stop of the electric power vehicle or a case where the electric power vehicle is charged by connection with the external charger 40.

That is, the external device 42 can be used by connection with the battery 12 even during the malfunction of the CMU 16, and the external device 42 can be continuously used by charging the battery 12 within the range that the actual charge current amount does not exceed the predetermined value Ix.

Figure 3:
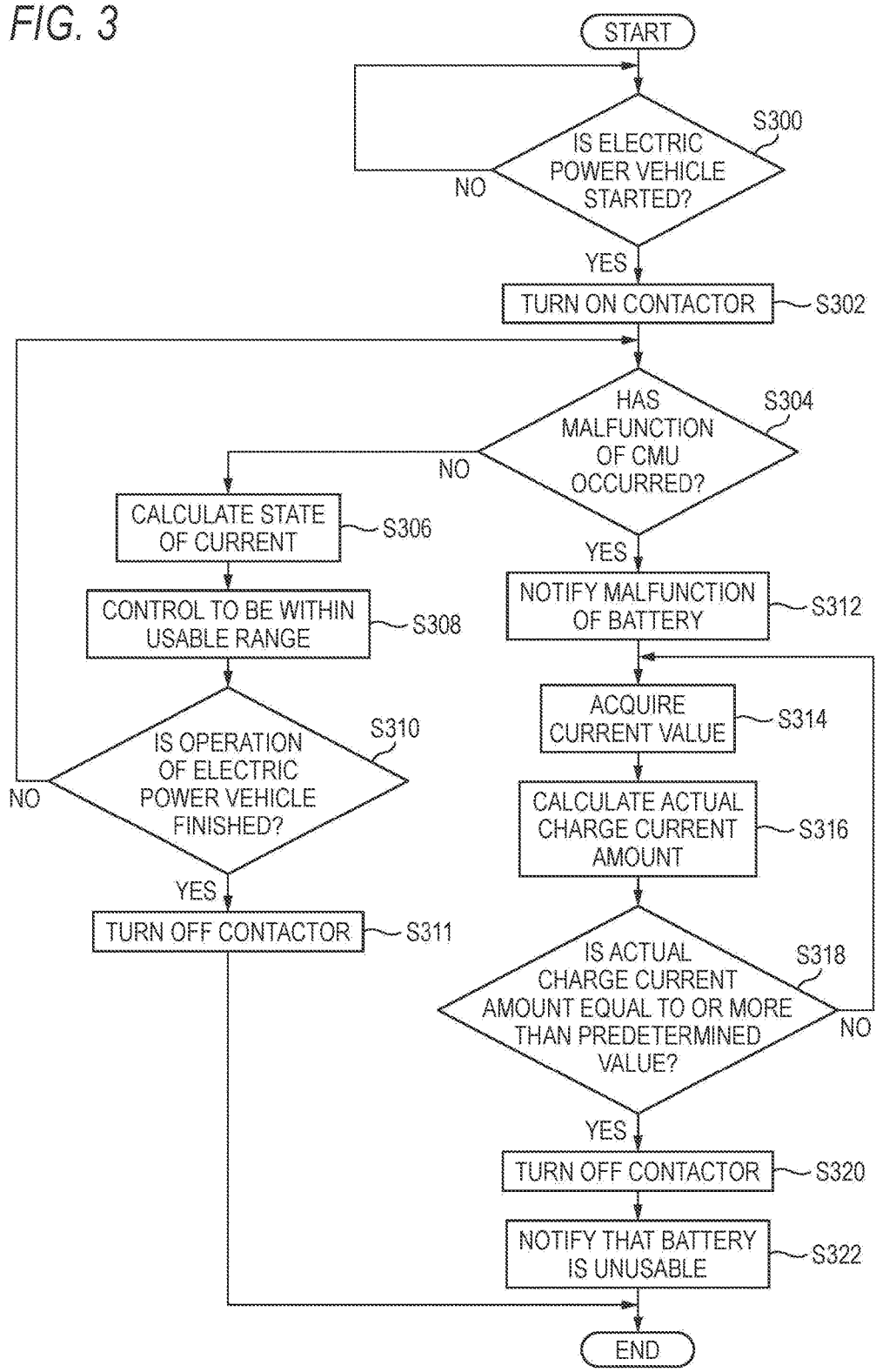
FIG. 3 is a flowchart illustrating a process of the battery controller 10.

FIG. 3 is a flowchart illustrating a process of the battery controller 10.

In an initial state of the flowchart in FIG. 3, the main contactor 30 is assumed to be turned off (opened).

When the electric power vehicle is started (step S300: Yes), the battery controller 10 controls the contactor control unit 110 such that the main contactor 30 is turned on (closed), thereby making the input/output of the power from the battery 12 possible (step S302).

Subsequently, the malfunction detection unit 106 determines whether the malfunction of the CMU 16 has occurred (step S304).

When the malfunction has not occurred (step S304: No), the SOC calculating unit 102 acquires the voltage of the battery 12 from the CMU 16, calculates the SOC (step S306), and controls the charge/discharge control unit 104 such that the SOC of the battery 12 is within the prescribed usable range (step S308).

When the operation of the electric power vehicle is not finished (step S310: No), the battery controller 10 returns to step S304 and repeats subsequent steps. Then, when the operation of the electric power vehicle is finished (step S310: Yes), the main contactor 30 is turned off (opened) by the contactor control unit 110 (step S311), and the process of this flowchart is ended.

On the other hand, when the malfunction has occurred in step S304 (step S304: Yes), the notification control unit 108 outputs information for notifying the malfunction of the battery 12 to the display unit 26 (step S312). A user can view the notification of the display unit 26, recognizes that the battery 12 is in a state different from the normal state, and quickly performs countermeasures such as a repair in an easy manner.

Further, the contactor control unit 110 acquires a current value flowing through the power supply line PL detected by the ammeter 22 (step S314), and calculates the actual charge current amount obtained by subtracting the integrated value of the discharge current from the integrated value of the charge current (step S316). Until the actual charge current amount is equal to or more than the predetermined value (step S318: No), the process returns to step S314, the current value is acquired and the actual charge current amount is calculated.

When the actual charge current amount is equal to or more than the predetermined value (step S318: Yes), the contactor control unit 110 turns off (opens) the main contactor 30 and prohibits the input/output of the current to and from the battery 12 (step S320).

In addition, the notification control unit 108 outputs information for notifying the fact that the battery 12 is unusable, to the display unit 26 (step S322), and the process of the flowchart is ended.

As described above, according to the battery controller 10 of the embodiment, when the malfunction of the voltage detector (CMU 16) in the battery 12 is detected, the charge current to be supplied to the battery 12 and the discharge current output from the battery 12 are integrated; and when the actual charge current amount obtained by subtracting the integrated value of the discharge current from the integrated value of the charge current is equal to or more than the predetermined value, the charging/discharging to and from the battery 12 is prohibited.

Therefore, even after the malfunction of the voltage detector (CMU 16) occurs, it is advantageously possible to continuously use the battery 12 while preventing the damage of surrounding members due to influence caused by the overcharge of the battery 12, for example, due to the malfunction or heat generation of the battery 12.

Further, when the actual charge current amount is in the range less than the predetermined value, the charging of the battery 12 is permitted, and thus it is advantageously possible to prolong the usable period of the battery 12 and improve the convenience of the user, compared to the case where the charging of the battery 12 is prohibited.

Further, according to the battery controller 10, when the battery 12 is used as the power supply for driving the electric power vehicle, the electric power vehicle can travel throughout a period of time even after the malfunction of the voltage detector (CMU 16) occurs. Thus, it is advantageously possible to avoid a situation in which the battery 12 becomes suddenly unavailable while the electric power vehicle is gone and thus the electric power vehicle is stalled, for example, and facilitate the flow of traffic on the road.

According to the battery controller 10, when the battery 12 is used as the power supply for driving the external device 42, the external device 42 can be used throughout a period of time even after the malfunction of the voltage detector (CMU 16) occurs. Thus, it is advantageously possible to improve the convenience at the time of using the external device 42 at a place where the user has gone or during power failure.

According to the battery controller 10, since the upper limit value (predetermined value) of the actual charge current amount is set based on the SOC calculated using the voltage immediately before the malfunction of the voltage detector (CMU 16) is detected, it is advantageously possible to efficiently utilize performance of the battery.

According to the battery controller 10, the malfunction of the voltage detector (CMU 16) is notified to the user as the malfunction of the battery 12, and thus it is advantageous that the user can quickly take the countermeasure such as a repair.

What is claimed is:

1. A battery controller that controls a battery for supplying driving power to a load apparatus, comprising:
    a current detection unit that detects a discharge current to be discharged from the battery and a charge current to be charged to the battery;
    a malfunction detection unit that detects malfunction of a voltage detector for detecting a voltage of the battery; and
    a contactor control unit that controls opening/closing of a contactor provided on a power supply line through which the discharge current and the charge current flow, the power supply line connecting the battery and the load apparatus,
    wherein the contactor control unit integrates the charge current and the discharge current detected by the current detection unit when the malfunction of the voltage detector is detected by the malfunction detection unit, calculates an actual charge current amount which is obtained by subtracting an integrated value of the discharge current from an integrated value of the charge current, and prohibits charging/discharging to and from the battery by controlling the contactor to be opened when the actual charge current amount is equal to or more than a predetermined value.

2. The battery controller according to claim 1, wherein the load apparatus is a traveling motor of an electric power vehicle, the discharge current is used to run the traveling motor, and the charge current is generated by regeneration of the traveling motor.

3. The battery controller according to claim 2, wherein a body of the electric vehicle is provided with a charge and discharge connector that is connectable to an external charger for charging the battery or an external device for driving using power of the battery, and the discharge current is used to drive the external device, and the charge current is supplied from the external charger.

4. The battery controller according to claim 1, further comprising:
    a state-of-charge calculating unit that calculate a state of charge of the battery based on the voltage detected by the voltage detector,
    wherein the contactor control unit sets a predetermined value based on the state of charge calculated using the voltage immediately before the malfunction of the voltage detector is detected.

5. The battery controller according to claim 2, further comprising:
    a state-of-charge calculating unit that calculate a state of charge of the battery based on the voltage detected by the voltage detector,
    wherein the contactor control unit sets a predetermined value based on the state of charge calculated using the voltage immediately before the malfunction of the voltage detector is detected.

6. The battery controller according to claim 3, further comprising:

a state-of-charge calculating unit that calculate a state of charge of the battery based on the voltage detected by the voltage detector, wherein the contactor control unit sets a predetermined value based on the state of charge calculated using the voltage immediately before the malfunction of the voltage detector is detected.

7. The battery controller according to claim 4, wherein the higher the state of charge calculated based on the voltage detected by the voltage detector immediately before the malfunction of the voltage detector is detected is, the smaller the predetermined value to be set by the contactor control unit is.

8. The battery controller according to claim 5, wherein the higher the state of charge calculated based on the voltage detected by the voltage detector immediately before the malfunction of the voltage detector is detected is, the smaller the predetermined value to be set by the contactor control unit is.

9. The battery controller according to claim 6, wherein the higher the state of charge calculated based on the voltage detected by the voltage detector immediately before the malfunction of the voltage detector is detected is, the smaller the predetermined value to be set by the contactor control unit is.

10. The battery controller according to claim 1, wherein the higher a temperature of the battery is, the smaller the predetermined value to be set by the contactor control unit is.

11. The battery controller according to claim 2, wherein the higher a temperature of the battery is, the smaller the predetermined value to be set by the contactor control unit is.

12. The battery controller according to claim 3, wherein the higher a temperature of the battery is, the smaller the predetermined value to be set by the contactor control unit is.

13. The battery controller according to claim 4, wherein the higher a temperature of the battery is, the smaller the predetermined value to be set by the contactor control unit is.

14. The battery controller according to claim 5, wherein the higher a temperature of the battery is, the smaller the predetermined value to be set by the contactor control unit is.

15. The battery controller according to claim 6, wherein the higher a temperature of the battery is, the smaller the predetermined value to be set by the contactor control unit is.

16. The battery controller according to claim 7, wherein the higher a temperature of the battery is, the smaller the predetermined value to be set by the contactor control unit is.

17. The battery controller according to claim 8, wherein the higher a temperature of the battery is, the smaller the predetermined value to be set by the contactor control unit is.

18. The battery controller according to claim 9, wherein the higher a temperature of the battery is, the smaller the predetermined value to be set by the contactor control unit is.

19. The battery controller according claim 1, further comprising:

a notification unit that notifies the malfunction to a user when the malfunction of the voltage detector is detected by the malfunction detection unit.

* * * * *